United States Patent Office 3,808,171
Patented Apr. 30, 1974

3,808,171
POLYAMIDES HAVING REDUCED
FLAMMABILITY
Ali Akbar Mohajer, Cwmbran, England, assignor to Imperial Chemical Industries Limited, London, England
No Drawing. Continuation of abandoned application Ser. No. 164,146, July 19, 1971. This application Oct. 26, 1972, Ser. No. 300,981
Claims priority, application Great Britain, July 20, 1970, 35,037/70
Int. Cl. C09k 3/28
U.S. Cl. 260—45.75 R                      5 Claims

ABSTRACT OF THE DISCLOSURE

Polyamides having reduced flammability produced by the addition of halogen-containing aromatic compounds to the polyamide.

---

This is a continuation of application Ser. No. 164,146, filed July 19, 1971, now abandoned.

The present invention relates to the preparation of polymers, which term includes copolymers, having reduced flammability. It particularly, though not limitatively, relates to the preparation of polyamides having reduced flammability. It also relates to said polymers and to articles such as filaments, yarns, films and sheets prepared from said polymers by, for example, extrusion or moulding.

Numerous proposals have been put forward for conferring flame-resistance on normally flammable synthetic polymers, particularly when said polymers are to be used in the preparation of textile materials and the like. In many cases halogenated compounds have been employed with success, incorporated into the polymer at some suitable stage. However, in such cases the polymers with which such success has been attained are polymers relatively unreactive to halogen groups, such as polyolefins. In the case of relatively reactive polymers such as some condensation polymers and particularly polyamides, e.g. nylon 6.6, it has been found very difficult to find suitable halogenated compounds which can be effectively added in small amount, and which do not react with the polymer to produce a discolored or degraded product. Many of the compounds previously disclosed have been tried by applicants, such as chlorendic anhydride, hexachlorobenzene, etc. but in all cases the resulting polymer has been badly discolored, sometimes becoming nearly black, or even so degraded that its low viscosity made it unusable, for instance, for the preparation of textile fibres by melt spinning.

Applicants have now found that said discoloration or degradation can be substantially avoided if a particular class of halogenated compounds are added to said polymers, and particularly to polyamides, either during manufacture or in the fully polymerized molten state.

Said class of compounds is defined as follows:

(i) The molecule of the compound comprises one or more benzene rings or one or more condensed benzene ring structures or a combination of said rings and ring structures. Neighboring benzene rings may be joined by one or two links. If there is one link it may be a direct linkage or a linkage via groups which are stable in the polyamide melt such as —(CR$_2$)$_n$—, —O—, —SO$_2$—, —O—(CR$_2$)$_m$O—, where R is H or alkyl and $n$ is 1 or more and preferably 1 to 6, and $m$ is 2 or more and preferably 2 to 6, or

where R′ is aryl alkyl or (CH$_2$)$_p\phi$ where p>1 and $\phi$ indicates a benzene ring and where any aromatic ring may carry halogen substituents. If there are two links at least one linkage must be via one of the aforesaid groups.

(ii) At least one benzene ring or condensed ring structure is substituted by one or more halogens.

(iii) Points on the molecule may be substituted by polymer-reactive groups, such as amide forming groups or polymerizable derivatives thereof, provided such groups do not cause substantial polymer discoloration, which groups are preferably separated from any benzene ring or condensed ring structure by an alkylene group.

(iv) No halogen shall be in the ortho position to any other halogen nor to any electron accepting group.

Any ring or condensed ring stucture may be further substituted, preferably symmetrically, by non-reactive, non-polar groups such as methyl groups.

Groups which carry substituents which are unstable in the polyamide melt, e.g.

are unsuitable as linking groups as in stipulation (1) since they result in excessive discoloration of the polyamide melt.

In the above definition, by the term condensed ring structure we mean, for instance, a naphthalene or anthracene type of structurue. Symmetrical substitution on the molecule is preferred, particularly when said molecule is included in the polymer molecule, since such structures have been found to give the minimum interferences with the physical properties of the basic polymer and of the yarn produced from it.

Examples of compounds of the present invention are:

3,6-dibromodurene
bis(p-bromophenyl) ether
4-bromodiphenyl
2,7-dibromo-9,9-bis (β-carboxyethyl) fluorene
2,5-dibromo-p-phenylene diacetic acid
2,5-dibromo-3,6-dimethyl-p-phenylene diacetic acid Preferred compounds for use in practicing the present invention are:

bis(p-bromophenoxy) ethane
tris(p-bromophenyl) amine
2,4,6,2′,4′,6′-hexabromodiphenyl
1,3,5-tribromobenzene
2,4,6-tribromo mesitylene
2,7-dibromo-9,9-bis (β-carboxyethyl) fluorene
2,4,6,2′,4′,6′-hexabromodiphenyl methane
2,4,6,2′,4′,6′-hexabromodiphenyl ether
tris (2,4-dibromophenyl) amine It is preferred that such compounds be incorporated into the polymer in an amount such as to give a halogen content preferably between 0.5% and 5%, based on the weight of the final polymer. Applicants have found that compounds as hereinbefore defined, with the important stipulation (iv), can be added to condensation polymers such as polyamides in an amount small enough to produce no substantial changes in said polymers other than conferring good flame-resistance.

The actual amount of the compound added to the polymer will, of course, depend on many factors such as, for instance, the structure of a fabric which may be made from flame-retardant filaments, the degree of flame-resistance required, etc.

Other additives may, of course, be incorporated into the polymer, particularly suitable metal oxides, called herein non-discoloring oxides, for example, titanium dioxide or antimony trioxide, which exert a synergistic effect with the flame retardant compound, without causing excessive discoloration or other change in property.

The preferred halogen is bromine since this element is more active than chlorine in conferring flame-resistance and so allows less of the compound to be added to the polymer.

When no polymer-reactive groups are present in the molecule of the compound the preferred halogen is bromine.

Bromine compounds not only have more efficient flame retardant properties than chlorine but are less volatile under normal processing conditions. Of course halogen loss is not so great in the case of massive molded articles as it is in the case of melt-spun filaments.

An advantage of compounds substituted by polymer-reactive groups is that they link into the polymer chain and this considerably reduces the loss of halogen during processing, e.g. spinning, wet processing of yarns, etc.

Said compounds may be added at any suitable stage in polymer manufacture or to the molten fully polymerized material, according to which gives the best results. They may be added in the form of a solid or a solution or a melt. They may be incorporated into the polymer either in the form of part of the polymer chemical structure, linked-in via reactive groups or, in the case where no reactive groups are present, in the form of a solution or a dispersion in the polymer. Previous to incorporation they may be made into a master-batch consisting of polymer containing a high percentage of the compound, which master-batch is then mixed into the rest of the polymer. The flame retardant compound may also be added continuously in pelletized form to the molten polymer prior to its shaping-extrusion, e.g. in the spinning unit, the rate of addition of the pellets being controlled to give the desired concentration of additive in the extruded polymer.

In order to measure flame-resistance the following test is used: The apparatus consists of a metal frame 16" long x 3½" wide, inclined at 45°. A Bunsen burner is fixed so that it can be pivoted to come into contact with the bottom of the plane of the frame.

The sample stocking panel when flat measures 16" x 4". A strip of glass fibre non-woven fabric is cut 16" x 5". The glass fibre is then "burned" in a flame to burn-off any inflammable material present. To form the test specimens the sample stocking panel is mounted centrally on the glass fibre fabric. A line of staples is run vertically up the center of the composite panel, ends barely touching, and the two parallel long edges are stapled at 4" intervals. The positioning of the staples is important as they act as heat conductors.

The specimen is mounted on the metal frame with the bottom edge even with the bottom of the frame and held there by means of stentor pins protruding from the upper surface of the frame. The holder is placed in a draught-free cabinet, the sliding door of which is closed to within 4" of the bottom of the cabinet, the Bunsen burner is lit and the flame adjusted to a height of 1". A flame is applied to the center of the bottom edge of the specimen for 15 seconds and is then removed.

The burning time after removal of the Bunsen burner, and the charred length from the bottom edge are noted.

The test is carried out on six samples and the mean burning times and mean char-lengths are found.

The present invention will now be illustrated, in no way limitatively, by the following examples.

EXAMPLE I 91.8 parts by weight of 6.6 nylon polymer containing 2% antimony trioxide and 8.2 parts of bis(p-bromophenyl) ether were well mixed, the system purged with nitrogen and heated for 15 minutes under a stream of nitrogen in an oil bath at 285° C. until the mixture was melted. The mixture was then stirred vigorously for 15 minutes to produce a homogeneous, viscous melt. It was then allowed to cool, with the stirrer removed from the melt.

The almost white polymer had an inherent viscosity of 0.89, a vicat softening point of 266° C., a relative viscosity of 49.0, AEG (amine end groups)=26.45 equiv./$10^6$ gm., CEG (carboxyl end groups)=89 equiv./$10^6$ gm. and contained 3.42% bromine.

It was melt spun at 285° C. into a 5-filament yarn at a wind-up speed of 400 ft./minute. The yarn was cold drawn at a draw ratio of 3.8 to give the following yarn properties:

Denier _____ 31.0
Extensibility, percent _____ 45.2
Tenacity, g./d. _____ 4.06
Initial modulus, g./d. _____ 22.3

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 0.5%, indicating loss of bromine during processing and scouring.

Simultaneously, a scoured control sample of yarn from 6.6 nylon was tested under the same conditions. The results are tabulated in Table I.

TABLE I

| Sample | Mean char length, in. | Mean burning time, sec. |
|---|---|---|
| 6.6 nylon plus bis(p-bormo phenyl) ether plus 2% $Sb_2O_3$ | 2.38 | 3.6 |
| 6.6 control | 16 | 35.6 |

The yarn containing bromine and antimony trioxide was shown to have an improved degree of flame retardance compared with the control yarn.

EXAMPLE II 45.9 parts by weight of 6.6 nylon and 4.1 parts of bis (p-bromophenyl) ether were well mixed, the system purged with nitrogen and heated for 10 minutes under a stream of nitrogen at 285° C. The mixture was then vigorously stirred for 15 minutes to produce a homogeneous, viscous melt. It was then allowed to cool with the stirrer removed from the melt.

The cream polymer had an inherent viscosity of 0.92, a vicat softening point of 267° C., a relative viscosity of 48.9, AEG=33.2 equiv./$10^6$ gm., CEG=63.0 equiv./$10^6$ gm. and contained 3.59% bromine.

It was melt spun at 273° C. into a 5-filament yarn at a wind-up speed of 400 ft./minute. The yarn was cold drawn at a draw ratio of 4.0 to give the following yarn properties:

Denier _____ 40.0
Extensibility, percent _____ 41.5
Tenacity g./d. _____ 3.93
Initial modulus, g./d. _____ 23.5

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 0.7%. The flame test results are shown in Table II below:

TABLE II

| Sample | Mean char length, in. | Mean burning time, sec. |
|---|---|---|
| 6.6 nylon plus bis (p-bromophenyl) ether | 10 | 51.0 |

The yarn containing bromine alone was seen to have an improved degree of flame retardance over the control but less than in the yarn containing bromine and antimony trioxide (see Example I).

EXAMPLE III 92.70 parts by weight of 6.6 nylon containing 2% antimony trioxide and 7.30 parts of dibromodurene were well mixed, the system vacuum purged with nitrogen and heated at 285° C. for 20 minutes under a stream of nitrogen. The mixture was then stirred vigorously for 10 minutes to produce a homogeneous viscous melt. It was then allowed to cool with the stirrer removed from the melt.

The slightly off-white polymer had an inherent viscosity of 0.94, a vicat softening point of 267° C., a relative viscosity of 87.9, AEG=22.7 equiv./$10^6$ gm., CEG=113.3 equiv./$10^6$ gm. and contained 2.91% bromine.

It was melt spun at 290° C. into a 5-filament yarn at a wind-up speed of 380 ft./minute. The yarn was hot drawn at a draw ratio of 3.6 to give the following yarn properties:

Denier _____ 35.0
Extensibility, percent _____ 39.2
Tenacity, g./d. _____ 4.49
Initial modulus, g./d. _____ 32.2

The yarn was knitted into hoselegs approximately 4" wide on a circular knitting machine and the hoselegs tested for flammability by the method described, after being subjected to an aqueous scour to remove spinning finish.

Simultaneously, a scoured control sample of yarn from 6.6 nylon was tested under the same conditions. The results are tabulated below:

TABLE III

| Sample | Mean char length, in. | Mean burning time, sec. |
|---|---|---|
| 6.6 nylon plus dibromodurene plus 2% Sb₂O₃ | 2.33 | 9.9 |
| 6.6 control | 16 | 35.6 |

The sample containing bromine and antimony trioxide, had an improved degree of flame retardance over the control. On analysis it was shown to contain 1.71% bromine.

EXAMPLE IV

A 4-litre autoclave was charged with 1550 parts by weight of hexamethylene diammonium adipate, 226 parts of the hexamethylene diammonium salt of 2,7-dibromo-9,9-bis($\beta$-carboxyethyl) fluorene (DBFA), 2% of the weight of final polymer of antimony trioxide, ⅓ mole percent of an aqueous solution of acetic acid, 1 mole percent of hexamethylene diamine and 1000 parts of water and polymerization carried out in the conventional manner.

The resulting polymer had a relative viscosity of 38.5, AEG=58.8 equiv./$10^6$ gm., CEG=99.2 equiv./$10^6$ gm. and contained 3.70 bromine.

It was screw-extruded to give a 20-filament yarn and the yarn drawn, with the drawing pin at 70° C. at a draw ratio of 2.8 to give the following properties:

Denier _____ 92.0
Extensibility, percent _____ 23.0
Tenacity, g./d. _____ 3.0
Initial modulus, g./d. _____ 17.4

The yarn was knitted into hoselegs approximately 4" wide on a circular knitting machine and the hoselegs tested for flammability according to the method described, after being subjected to a methanol/cyclohexane extraction, to remove spinning finish.

Simultaneously, a scoured sample of yarn from 6.6 nylon was tested under the same conditions. The results are tabulated below:

TABLE IV

| Sample | Mean char length, in. | Mean burning time, sec. |
|---|---|---|
| 6.6 nylon plus 2% Sb₂O₃ plus DBFA salt | 1.38 | 14.0 |
| 6.6 control | 16 | 64.5 |

The sample containing bromine and antimony trioxide was shown to have an improved degree of flame retardance over the control. It was shown to contain 3.42% bromine (no appreciable loss of bromine had taken place).

EXAMPLE V

The autoclave was charged with 1620 parts by weight of hexamethylene diammonium adipate, 170 parts of the hexamethylene diammonium salt of 2,7-dibromo-9,9 bis ($\beta$-carboxy-ethyl) fluorene, 2% of the weight of final polymer of antimony trioxide, 0.3 mole percent of an aqueous solution of acetic acid and 1000 parts of water and polymerization carried out in the conventional manner.

The resulting polymer had a vicat softening point of 265° C. a relative viscosity of 39.5, AEG=34 equiv./$10^6$ gm., CEG=111.5 equiv./$10^6$ gm. and contained 2.78% bromine.

It was screw-extruded to give a 20-filament yarn and the yarn was drawn with a drawing pin temperature of 70° C., at a draw ratio of 3.2 to give the following properties:

Denier _____ 76.0
Extensibility, percent _____ 16.0
Tenacity, g./d. _____ 4.10
Initial modulus, g./d. _____ 23.2

The yarn was knitted into hoselegs approximately 4" wide on a circular knitting machine and the hoselegs tested for flammability according to the method described without being scoured.

Simultaneously, a control sample of yarn from 6.6 nylon was tested and the results are tabulated in Table V.

TABLE V

| Sample | Mean char length, in. | Mean burning time, sec. |
|---|---|---|
| 6.6 nylon plus 2% Sb₂O₃ plus DBFA salt | 1.65 | 18.0 |
| 6.6 control | 16 | 62.1 |

The yarn containing bromine and antimony trioxide was self-extinguishing and had a higher degree of flame retardance than the control. It was shown to contain 2.69% bromine (no appreciable loss of bromine).

EXAMPLE VI 92.94 parts by weight of 6.6 nylon polymer containing 2% antimony trioxide and 7.06 parts of bis(p-bromophenoxy) ethane were well mixed, the system purged with nitrogen and heated for 30 minutes under an atmosphere of nitrogen in an oil bath at 285° C. until the mixture was melted. The mixture was then stirred vigorously for 15 minutes to produce a homogeneous, viscous melt. It was then allowed to cool, with the stirrer removed from the melt.

The almost white polymer had a vicat softening point of 274° C., a relative viscosity of 61.3, AEG (amine end groups)=38.2 equiv./$10^6$ gm., CEG (carboxyl end groups)=146.0 equiv./$10^6$ gm. and contained 2.76% bromine.

It was melt spun at 310° C. into a five-filament yarn at a wind-up speed of 400 ft./minute. The yarn was hot drawn at 120° C. at a draw ratio of 4.0 to give the following yarn properties:

Denier _____ 40.4
Extensibility, percent _____ 39.0
Tenacity, g./d. _____ 3.07

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 1.13%.

Simultaneously, a scoured control sample of yarn from 6.6 nylon was tested under the same conditions. The results are tabulated in the following table.

TABLE VI

| Sample | Mean char length, in. | Mean burning time, sec. |
|---|---|---|
| 6.6 nylon plus bis(p-bromophenoxy) ethane plus 2% $Sb_2O_3$ | 2.33 | 28.9 |
| 6.6 control | 16 | 76.0 |

The yarn containing bromine and antimony trioxide was shown to have an improved degree of flame retardance compared with the control yarn.

EXAMPLE VII 94.16 parts by weight of 6.6 nylon polymer containing 2% antimony trioxide and 5.84 parts of tris(p-bromophenyl) amine were well mixed, the system purged with nitrogen and heated for 30 minutes under an atmosphere of nitrogen in an oil bath at 285° C. until the mixture was melted. The mixture was then stirred vigorously for 10 minutes to produce a homogeneous, viscous melt. It was then allowed to cool with the stirrer removed from the melt.

The white polymer had a vicat softening point of 266° C., a relative viscosity of 71.3, AEG (amine end groups)=26.6 equiv./$10^6$ gm., CEG (carboxyl end groups)=89.5 equiv./$10^6$ gm. and contained 3.01% bromine.

It was melt spun at 300° C. into a 5-filament yarn at a wind-up speed of 400 ft./minute. The yarn was cold drawn at a draw ratio of 3.5 to give the following yarn properties:

Denier _____ 22.2
Tenacity, g./d. _____ 4.15
Extensibility, percent _____ 64.1

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 2.43%.

Simultaneously, a scoured control sample of yarn from 6.6 nylon was tested under the same conditions. The results are tabulated below:

TABLE VII

| Sample | Mean char length, in. | Mean burning time, sec. |
|---|---|---|
| 6.6 nylon plus tris (p-bromophenyl) amine plus 2% $Sb_2O_3$ | 1.88 | 10.7 |
| 6.6 control | 16 | 141.2 |

The yarn containing bromine and antimony trioxide was shown to have an improved degree of flame retardance compared with the control yarn.

EXAMPLE VIII 94.65 parts by weight of 6.6 nylon polymer containing 2% antimony trioxide and 5.35 parts of 2,4,6,2',4',6'-hexabromodiphenyl were well mixed, the system purged with nitrogen and heated for 20 minutes under an atmosphere of nitrogen in an oil bath at 285° C. until the mixture was melted. The mixture was then stirred vigorously for 20 minutes to produce a homogeneous, viscous melt. It was then allowed to cool, with the stirrer removed from the melt.

The white polymer had a relative viscosity of 38.2, a vicat softening point of 264° C., AEG (amine end groups)=5.8 equiv./$10^6$ gm., CEG (carboxyl end groups)=157.0 equiv./$10^6$ gm. and contained 4.19% bromine.

It was melt spun at 280° C. into a 10-filament yarn at a wind-up speed of 400 ft./minute. The yarn was hot drawn at 100° C., at a draw ratio of 4.0, to give the following yarn properties:

Denier _____ 36.1
Tenacity, g./d. _____ 3.55
Extensibility, percent _____ 25.30
Initial modulus, g./d. _____ 20.70
Hot water shrinkage, percent _____ 12.6

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 2.70%.

Simultaneously, a scoured control sample of yarn from 6.6 nylon was tested under the same conditions. The results are tabulated below:

TABLE VIII

| Sample | Mean char length, in. | Mean burning time, sec. |
|---|---|---|
| 6.6 nylon plus hexabromodiphenyl plus 2% $Sb_2O_3$ | 2.04 | 4.2 |
| 6.6 control | 16 | 141.2 |

The yarn containing bromine and antimony trioxide was shown to have an improved degree of flame retardance compared with the control yarn.

EXAMPLE IX 96.06 parts by weight of 6.6 nylon polymer containing 2% antimony trioxide and 3.94 parts of 1,3,5-tribromobenzene were well mixed, the system purged with nitrogen and heated for 30 minutes under an atmosphere of nitrogen in an oil bath at 285° C. until the mixture was melted. The mixture was stirred vigorously for 10 minutes to produce a homogeneous, viscous melt. It was then allowed to cool with the stirrer removed from the melt.

The white polymer had a vicat softening point of 270.5° C., a relative viscosity of 52.8, AEG (amine end groups) =19.4 equiv./$10^6$ gm., CEG (carboxyl end groups) =137.3 equiv./$10^6$ gm. and contained 1.89% bromine.

It was melt spun at 305° C. into a 5-filament yarn at a wind-up speed of 400 ft./minute. The yarn was hot drawn at 120° C., at a draw ratio of 4.0, to give the following yarn properties:

Denier _____ 26.5
Tenacity, g./d. _____ 4.30
Extensibility, percent _____ 29.4

The yarn was knitted into hoselegs approximately 4" wide on a circular knitting machine and the hoselegs tested for flammability by the method described, after being subjected to an aqueous scour to remove spinning finish.

Simultaneously, a scoured control sample of yarn from 6.6 nylon was tested under the same conditions. The results are tabulated below:

TABLE IX

| Sample | Mean char length, in. | Mean burning time, sec. |
|---|---|---|
| 6.6 plus 1,3,5-tribromobenzene plus 2% $Sb_2O_3$ | 5.75 | 14.0 |
| 6.6 control | 15 | 69.8 |

The yarn containing bromine and antimony trioxide was shown to have an improved degree of flame retardance compared with the control yarn.

EXAMPLE X 94.06 parts by weight of 6.6 nylon polymer containing 2% antimony trioxide and 5.94 parts of 2,4,6-tribromomesitylene were well mixed, purged with nitrogen and heated for 20 minutes under an atmosphere of nitrogen in an oil bath at 285° C. until the mixture was melted. The mixture was then stirred vigorously for 10 minutes to produce a homogeneous, viscous melt. It was then allowed to cool with the stirrer removed from the melt.

The white polymer had a vicat softening point of 266.5° C., a relative viscosity of 71.9, AEG (amine end groups) =32.0 equiv./10⁶ gm., CEG (carboxyl end groups)=87.0 equiv./10⁶ gm. and contained 3.42% bromine.

It was melt spun at 296° C. into a 5-filament yarn at a wind-up speed of 400 ft./minute. The yarn was hot drawn at 80° C., at a draw ratio of 4.0, to give the following yarn properties:

Denier _____ 35.2
Tenacity, g./d. _____ 3.21
Extensibility, percent _____ 54.4

The yarn was knitted into hoselegs approximately 4" wide on a circular knitting machine and the hoselegs tested for flammability by the method described, after being subjected to an aqueous scour to remove spinning finish.

Simultaneously, a scoured control sample of yarn from 6.6 nylon was tested under the same conditions. The results are tabulated below:

TABLE X

| Sample | Mean char length, in. | Mean burning time, sec. |
|---|---|---|
| 6.6 plus 2,4,6-tribromomesitylene plus 2% Sb₂O₃ | 1.75 | 19.12 |
| 6.6 control | 16 | 42.6 |

The yarn containing bromine and antimony trioxide was shown to have an improved degree of flame retardance compared with the control.

EXAMPLE XI 95.88 parts by weight of 6.6 nylon polymer containing 2% antimony trioxide and 4.12 parts of 2,4,6-tribromoaniline were well mixed, purged with nitrogen and heated for 25 minutes under an atmosphere of nitrogen in an oil bath at 285° C., until the mixture was melted. The mixture was then stirred vigorously for 15 minutes to produce a homogeneous, viscous melt. It was then allowed to cool, with the stirrer removed from the melt.

The white polymer had a relative viscosity of 55.7, a vicat softening point of 274° C., AEG (amine end groups)=30.7 equiv./10⁶ gm., CEG (carbonyl end groups)=87.0 equiv./10⁶ gm. and contained 2.21% bromine.

It was melt spun at 295° C. into a 5-filament yarn at a wind-up speed of 400 ft./minute. The yarn was cold drawn at a draw ratio of 4.0 to give the following yarn properties:

Denier _____ 36.5
Extensibility, percent _____ 25.7
Tenacity, g./d. _____ 3.92

The yarn was knitted into hoselegs approximately 4" wide on a circular knitting machine and the hoselegs tested for flammability by the method described, after being subjected to an aqueous scour to remove spinning finish.

Simultaneously, a scoured control sample of yarn from 6.6 nylon was tested under the same conditions. The results are tabulated below:

TABLE XI

| Sample | Mean char length, in. | Mean burning time, sec. |
|---|---|---|
| 6.6 plus 2,4,6-tribromoaniline plus 2% Sb₂O₃ | 2.58 | 23.8 |
| 6.6 control | 16 | 141.2 |

The yarn containing bromine and antimony trioxide was shown to have an improved degree of flame retardance compared with the control.

EXAMPLE XII 95.22 parts by weight of 6.6 nylon polymer containing 2% antimony trioxide and 4.78 parts of 2,4,6,2',4',6'-hexabromodiphenyl ether were well mixed, purged with nitrogen and heated for 25 minutes under an atmosphere of nitrogen in an oil bath at 285° C. until the mixture was melted. The mixture was stirred vigorously for 20 minutes to produce a homogeneous, viscous melt. It was then allowed to cool, with the stirrer removed from the melt.

The off-white polymer had a relative viscosity of 40.0, a vicat softening point of 268° C., CEG (carboxyl end groups)=175.0 equiv./10⁶ gm., AEG (amine end groups)=5.1 equiv./10⁶ gm. and contained 3.64% bromine.

It was melt spun at 292° C. into a 10-filament yarn at a wind-up speed of 400 ft./minute. The yarn was hot drawn at 100° C. at a draw ratio of 4.0, to give the following yarn properties:

Denier _____ 70.5
Tenacity, g./d. _____ 3.55
Extensibility, percent _____ 33.6
Initial modulus, g./d. _____ 22.6
Hot water shrinkage, percent _____ 13.2

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 2.9% (~17% loss of Br).

Simultaneously, a scoured control sample of yarn from 6.6 nylon was tested under the same conditions. The results are tabulated below:

TABLE XII

| Sample | Mean char length, in. | Mean burning time, sec. |
|---|---|---|
| 6.6 plus hexabromodiphenyl ether plus 2% Sb₂O₃ | 2.28 | 24.09 |
| 6.6 control | 16 | 117.5 |

The yarn containing bromine and antimony trioxide was shown to have an improved degree of flame retardance compared with the control.

EXAMPLE XIII 94.68 parts by weight of 6.6 nylon polymer containing 2% antimony trioxide and 5.32 parts of brominated 1,3,5-triphenyl benzene (percent Br=65.8) were well-mixed, purged with nitrogen and heated for 25 minutes under a stream of nitrogen in an oil bath at 285° C. until the mixture was melted. The mixture was stirred vigorously for 15 minutes to produce a homogeneous viscous melt. It was then allowed to cool, with the stirrer removed from the melt.

The white polymer had a relative viscosity of 47.9, a vicat softening point of 270° C., AEG (amine end groups)=17.1 equiv./10⁶ gm., CEG (carboxyl end groups)=138.0 equiv./10⁶ gm. and contained 3.62% bromine.

It was melt spun at 294° C. into a 10-filament yarn at a wind-up speed of 400 ft./minute. The yarn was hot drawn at 100° C., at a draw ratio of 4.0, to give the following yarn properties:

Denier _____ 42.6
Tenacity, g./d. _____ 3.95
Extensibility, percent _____ 29.0
Initial modulus, g./d. _____ 22.1
Hot water shrinkage, percent _____ 12.5

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 3.5% (little loss of Br).

Simultaneously, a scoured control sample of yarn from 6.6 nylon was tested under the same conditions. The results are shown below:

TABLE XIII

| Sample | Mean char length, in. | Mean burning time, sec. |
|---|---|---|
| 6.6 plus brominated 1,3,5-triphenyl benzene plus 2% $Sb_2O_3$ | 3.0 | 36.3 |
| 6.6 control | 16 | 117.5 |

The yarn containing bromine and antimony trioxide was shown to have an improved degree of flame retardance compared with the control.

EXAMPLE XIV 95.23 parts by weight of 6.6 nylon polymer containing 2% antimony trioxide and 4.77 parts of brominated m-terphenyl percent Br=73.4), were well-mixed, purged with nitrogen and heated for 20 minutes until the mixture was melted. The mixture was stirred vigorously for 20 minutes to produce a homogeneous, viscous melt. It was then allowed to cool with the stirrer removed from the melt.

The off-white polymer had a relative viscosity of 39.4, a vicat softening point of 260° C., AEG (amine end groups)=7.5 equiv./$10^6$ gm., CEG (carboxyl end groups)=183.0 equiv./$10^6$ gm. and contained 3.46% bromine.

It was melt spun at 285° C. into a 10-filament yarn at a wind-up speed of 400 ft./minute. The yarn was hot drawn at 100° C., at a draw ratio of 4.0, to give the following yarn properties:

Denier _____ 42.8
Tenacity, g./d. _____ 3.92
Extensibility, percent _____ 21.9
Initial modulus, g./d. _____ 25.3
Hot water shrinkage, percent _____ 11.9

The yarn was knitted into hoselegs approximately 4" wide on a circular knitting machine and test for flammability by the method described, after being subjected to an aqueous scour to remove spinning finish. Analysis of the fabric gave a bromine content of 3.05% (~11% loss of Br).

Simultaneously, a scoured control sample of yarn from 6.6 nylon was tested under the same conditions. The results are tabulated below:

TABLE XIV

| Sample | Mean char length, in. | Mean burning time, sec. |
|---|---|---|
| 6.6 plus brominated m-terphenyl plus 2% $Sb_2O_3$ | 2.38 | 22.08 |
| 6.6 control | 16 | 76.0 |

The yarn containing bromine and antimony trioxide was shown to have an improved degree of flame retardance compared with the control.

EXAMPLE XV

The autoclave was charged with 1600 parts by weight of hexamethylene diammonium adipate, 246 parts of the hexamethylene diammonium salt of 2,7-dibromo-9,9 bis (β-carboxyethyl) fluorene (DBFA), 4% of the weight of final polymer of antimony trioxide, 0.5 mole percent of an aqueous solution of acetic acid and 1000 parts of water and polymerization carried out in the conventional manner.

The resulting polymer had a relative viscosity of 27.6, AEG (amine end groups)=31.7 equiv./$10^6$ gm., CEG (carboxyl end groups)=150.0 equiv./$10^6$ gm. and contained 3.89% bromine.

It was melt spun at 279° to give a 10-filament yarn at a wind-up speed of 400 ft./minute. The yarn was hot drawn at 80° C., at a draw ratio of 4.0 to give the following yarn properties:

Denier _____ 86.5
Tenacity, g./d. _____ 3.44
Extensibility, percent _____ 23.3
Initial modulus, g./d. _____ 25.7
Hot water shrinkage, percent _____ 15.9

The yarn was knitted into hoselegs approximately 4" wide on a circular knitting machine and the hoselegs tested for flammability by the method described, after being subjected to an aqueous scour to remove spinning finish. Analysis of the fabric gave a bromine content of 3.63%.

Simultaneously, a scoured control sample of yarn from 6.6 nylon was tested under the same conditions. The results are tabulated below:

TABLE XV

| Sample | Mean char length, in. | Mean burning time, sec. |
|---|---|---|
| 6.6 nylon plus 3% $Sb_2O_3$ plus DBFA salt | 2.19 | 45.8 |
| 6.6 control | 16 | 117.5 |

The yarn containing bromine and antimony trioxide was shown to have an improved degree of flame retardance compared with the control.

EXAMPLE XVI

The polymer of Example XV was moulded into test bars as recommended by ASTM-D635-68 and their flammability compared with those of 6.6 nylon control. Both samples were "non-burning" according to ASTM-D635-68, in that, after twice igniting, the burning did not reach the 1" mark. The combined burning times of two ignitions are as follows:

test specimen: 3.0 seconds
6.6 control: 18.5 seconds

EXAMPLE XVII 95.27 parts by weight of 6.6/6 copolyamide polymer containing 2.40% antimony trioxide and 10.0% 6 nylon, and 4.73 parts of 2,4,6,2',4',6'-hexabromodiphenyl methane were mixed, purged with nitrogen and heated at 285° C. in an oil bath for 20 minutes under an atmosphere of nitrogen, until the mixture was molten. The mixture was stirred vigorously for 10 minutes to produce a homogeneous, viscous melt. It was then allowed to cool with the stirrer removed from the melt.

The polymer had a relative viscosity of 39.3, a vicat softening point of 255° C., and contained 3.62% bromine.

It was melt spun at 258° C. into a 10-filament yarn at a wind-up speed of 400 ft./minute. The yarn was cold drawn at a draw ratio of 4.0 to give the following yarn properties:

Denier _____ 100.5
Tenacity, g./d. _____ 3.88
Extensibility, percent _____ 49.3
Initial modulus, g./d. _____ 16.4
Hot water shrinkage, percent _____ 17.7

The yarn was knitted into hoselegs approximately 4" wide on a circular knitting machine and was tested for flammability by the method described after being subjected to an aqueous scour to remove spinning finish. Analysis of the fabric gave a bromine content of 2.9%.

Simultaneously, a scoured control sample of yarn from 6.6 nylon was tested under the same conditions. The results are tabulated below:

TABLE XVII

| Sample | Mean char length, in. | Mean burning time, sec. |
|---|---|---|
| 6.6/6 copolyamide plus 2.41% $Sb_2O_3$ plus hexabromodiphenyl methane | 1.88 | 15.6 |
| 6.6 control | 16 | 117.5 |

The yarn containing bromine and antimony trioxide was shown to have an improved degree of flame retardance compared to the control yarn.

EXAMPLE XVIII 94.7 parts by weight of 6.6/6 copolyamide polymer containing 10% 6 nylon and 2.8% antimony trioxide, and 5.27 parts of tris (2,4-dibromophenyl)amine were mixed, purged with nitrogen and heated at 285° C. in an oil bath for 20 minutes under an atmosphere of nitrogen, until the mixture was molten. The mixture was stirred vigorously for 10 minutes to produce a homogeneous, viscous melt. It was then allowed to cool with the stirrer removed from the melt.

The white polymer had a relative viscosity of 42.3, a vicat softening point of 254° C., AEG=35.5 equiv./$10^6$ gms., CEG=112.5 equiv./$10^6$ gm. and contained 3.63% bromine.

It was melt spun at 281° C. into a 10-filament yarn at a wind-up speed of 400 ft./minute. The yarn was cold drawn at a draw ratio of 4.0 to give the following yarn properties:

Denier _____ 81.3
Tenacity, g./d. _____ 3.95
Extensibility percent _____ 56.2
Initial modulus, g./d. _____ 10.2
Hot water shrinkage, percent _____ 18.7

The yarn was knitted into hoselegs approximately 4" wide on a circular knitting machine and was tested for flammability by the method described, after being subjected to an aqueous scour to remove spinning finish. Analysis of the fabric gave a bromine content of 3.05% (15% loss of Br).

Simultaneously, a scoured control sample of yarn from 6.6 nylon was tested under the same conditions. The results are tabulated below:

TABLE XVIII

| Sample | Mean char length, in. | Mean burning time, sec. |
|---|---|---|
| 6.6/6 copolyamide plus Sb₂O₃ plus tris (2,4-dibromophenyl) amine | 1.85 | 19.6 |
| 6.6 control | 16 | 117.5 |

The yarn containing bromine and antimony trioxide was shown to have an improved degree of flame retardance compared with the control yarn.

EXAMPLE XIX

Hexamethylene diammonium salt of 2,7-dibromo-9,9-bis (carboxy-ethyl) fluorene was converted to a "half-made" polymer (degree of polymerization≃4) by stirring 1500 parts of the salt with 1100 parts of distilled water in an autoclave, raising the temperature from 20° to 200° C. over a period of 2¾ hours and maintaining at 200° C. for 1 hour. The autoclave was allowed to cool down and the "half-made" polymer separated from water and dried. The "half-made" polymer was powdered (22-mesh) and the particle coated with poly(ethylene oxide) glycols of m. wt. 1540 and 4000 (1% of each based on the weight of the "half-made" polymer), applied as a methanolic solution to act as a binder. After the evaporation of methanol, the large granules were broken down again and the product converted to pellets of average weight 0.087 g. by means of a pelletizing machine.

6.6 nylon polymer containing 2.3% antimony trioxide was spun at the rate of 5.5 kg./hour on a conventional melt spinning machine with a melt pool capacity of 1020 g. The above "half-made" polymer pellets (152 g.), with a bromine content of 27%, were added in one lot, via a feed line to the melt pool, in order to bring the melt pool bromine content to a calculated value of 3.5%. Thereafter the pellets were introduced regularly by a pellet dispensing machine at the rate of 11.9 g./min. (137 pellets/min).

The white 20-filament yarn obtained, with a Br content of 3.2%, was drawn at 120° C. and a draw ratio of 4.0 to give a drawn yarn with the following properties:

Denier _____ 66
Tenacity, g./d. _____ 3.6
Extensibility, percent _____ 19
Initial modulus, g./d. _____ 20

The hoseleg stocking panel knitted from this yarn, scoured and tested for flammability according to the previous examples gave the following results:

TABLE XIX

| Sample | Mean char length, in. | Mean burning time, sec. |
|---|---|---|
| 6.6 plus 2% Sb₂O₃ plus 3.2% Br (from dibromo "F" acid) | 1.6 | 9.3 |
| 6.6 control | (¹) | 149 |

¹ Full length (16 in.).

EXAMPLE XX

The following compounds, not according to the present invention, were added to molten nylon 6.6 to give a halogen content of 2%. It can be seen that all of them produced a badly discolored product.

| Name of compounds | Observations in nylon melt |
|---|---|
| Tris(2,3-dibromopropyl) phosphate | Black. |
| 2,3,5,6-tetrachloro p-xylylenediamine | Do. |
| 1,2,4,5-tetrachlorobenzene | 95% sublimes out (what is left gives a creamy polymer). |
| Poly 2,2-bis(chloromethyl) oxypropylene. | Brown. |
| Tetrabromophthalic anhydride | Greenish brown (low R.V.). |
| Tetrabromobisphenol-A | Black. |
| Pentabromophenol | Do. |
| Pentachlorophenol | Do. |
| Hexachlorobenzene | Orange. |
| 4,5-dibromohexahydro phthalic anhydride. | Orange (low R.V.). |
| 2,5-dibromoterephthalic acid | Yellow (large part not amidated and lost at processing). |
| 2-bromoterephthalic acid | Khaki. |
| 4-bromoisophthalic acid | Dark grey. |
| 2,5-dichloroterephthalic acid | Brown. |
| Dimethyl 2,3,4,6-tetrachloroterephthalate. | Dark grey. |
| 2,3,5,6-tetrafluoro terephthalic acid | Khaki. |
| Chlorendic anhydride | Dark brown (low R.V.). |
| Pentaerythrityl dibromide | Dark grey. |
| Pentaerythrityl tribromide | Greenish grey. |
| Pentaerithrityl monochloral | Dark brown. |
| Pentaerythrityl dichloral | Do. |
| Decabromodiphenyl | Brown. |
| Dibromoisophthalic acid | Khaki. |
| 5,6,7,8,9,9-hexachloro-1,2,3,4,4a,5,8,8a-octahydronaphthalene 2,3-dicarboxylic anhydride. | Dark brown. |
| 2,5-dibromohydroquinone-O,O-diacetic acid. | Black. |
| Tetrabromo bis phenol-A O,O-diacetic acid. | Dark brown. |
| Bis(2-bromo-4-carbomethoxy phenoxy) ethane. | Brown. |
| Bis(2,4-dibromophenyl) amine | Purple-violet. |
| Bis(4-bromophenyl) amine | Purplish/pink. |

What is claimed is:
1. A polyamide composition wherein there is incorporated a compound selected from the group consisting of aromatic compounds having the formula

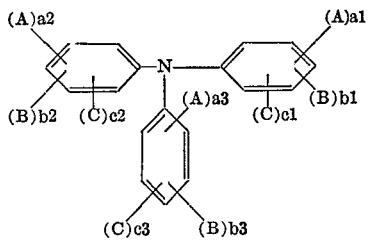

and aromatic amines having the formula

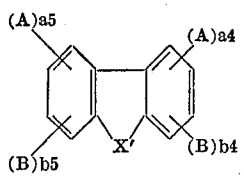

where
A is an alkyl group
B is selected from the group consisting of chlorine and bromine
C is an amide forming group
X' is $(CR_2)$ where R is selected from the group consisting of H, and alkyl group, a carboxyalkyl group and salts thereof, an alkoxycarbonylalkyl group and an aminocarbonylalkyl group,
$a1$, $a2$ and $a3$ are integers between 0 and 4
$b1$, $b2$ and $b3$ are integers between 1 and 3
$b4$ and $b5$ are integers between 1 and 2
$c1$, $c2$ and $c3$ are integers between 0 and 4
$a4$ and $a5$ are integers between 0 and 3,
none of the halogen groups being in an ortho position to any other.

2. A polyamide composition according to claim 1 wherein the origin polyamide is polyhexamethylene adipamide.

3. A polyamide composition according to claim 2 wherein the halogen group of the incorporated compound is a bromine group.

4. A polyamide composition according to claim 3 wherein the compound is incorporated to give a bromine content between 0.5% and 5% by weight.

5. A polyamide composition according to claim 4 containing a synergistic flame retardant metallic oxide.

References Cited
UNITED STATES PATENTS

| | | | |
|---|---|---|---|
| 2,028,715 | 1/1936 | Hanson | 252—8.1 |
| 2,216,835 | 10/1940 | Carothers | 260—33.8 |
| 2,257,903 | 10/1941 | Dreisbach | 260—650 |
| 3,251,773 | 5/1966 | Gunderson | 252—49.6 |
| 3,331,797 | 7/1967 | Kopetz et al. | 260—28.5 |
| 3,403,036 | 9/1968 | Hindersinn et al. | 260—45.75 |
| 3,535,300 | 10/1970 | Gable | 260—29.1 |
| 3,624,024 | 11/1971 | Caldwell et al. | 260—40 |
| 3,629,365 | 12/1971 | Gardner | 260—857 |

OTHER REFERENCES

Calderbank et al., Chemical Abstracts, vol. 68, 1968, 91263F.

Cope, J.A.C.S., vol. 57, 1935, pp. 572–574.

DONALD E. CZAJA, Primary Examiner

R. A. WHITE, Assistant Examiner

U.S. Cl. X.R.

260—45.7 R, 45.75 B, 45.85 A, 45.85 N, 45.85 R, 45.85 T, 45.9 R, 78 A, 78 R

UNITED STATES PATENT OFFICE
CERTIFICATE OF CORRECTION

Patent No. 3,808,171  Dated April 30, 1974

Inventor(s) Ali Akbar Mohajer

It is certified that error appears in the above-identified patent and that said Letters Patent are hereby corrected as shown below:

Column 15, line 1, "amines" should read -- compounds --.

Signed and Sealed this

Twenty-first Day of December 1976

[SEAL]

Attest:

RUTH C. MASON
Attesting Officer

C. MARSHALL DANN
Commissioner of Patents and Trademarks